United States Patent
Li

(10) Patent No.: US 10,095,063 B2
(45) Date of Patent: Oct. 9, 2018

(54) DIRECT TYPE BACKLIGHT MODULE AND DISPLAY DEVICE

(71) Applicants: BOE Technology Group CO., LTD., Beijing (CN); HEFEI BOE DISPLAY LIGHT CO., LTD., Hefei (CN)

(72) Inventor: Dejun Li, Beijing (CN)

(73) Assignees: BOE TECHNOLOGY GROUP CO., LTD., Beijing (CN); HEFEI BOE DISPLAY LIGHT CO., LTD., Hefei, Anhui Province (CN)

( * ) Notice: Subject to any disclaimer, the term of this patent is extended or adjusted under 35 U.S.C. 154(b) by 47 days.

(21) Appl. No.: 14/801,210

(22) Filed: Jul. 16, 2015

(65) Prior Publication Data

US 2016/0266439 A1 Sep. 15, 2016

(30) Foreign Application Priority Data

Mar. 13, 2015 (CN) ...................... 2015 2 0145672 U

(51) Int. Cl.
*G02F 1/1335* (2006.01)
*F21V 8/00* (2006.01)

(52) U.S. Cl.
CPC .. *G02F 1/133603* (2013.01); *G02F 1/133606* (2013.01); *G02B 6/002* (2013.01);
(Continued)

(58) Field of Classification Search
CPC ......... G02F 1/133603; G02F 1/133524; G02F 1/133606; G02F 1/133516; G02F 2001/133607; G02F 1/133526; G02B 3/0006; G02B 3/005; G02B 3/06; G02B 3/08; G02B 5/02; G02B 5/021;
(Continued)

(56) References Cited

U.S. PATENT DOCUMENTS 7,452,093 B2 * 11/2008 Nagao .................. G02B 6/0031
362/309
7,690,810 B2 * 4/2010 Saitoh .................... G02B 5/045
362/244

(Continued)

*Primary Examiner* — Angela Davison
(74) *Attorney, Agent, or Firm* — Womble Bond Dickinson (US) LLP

(57) ABSTRACT

The embodiments of the present invention provide a direct type backlight module and a display device to reduce the light mixing distance on the premise of obtaining a homogeneous illumination, thereby reducing the thickness of the direct type backlight module and the thickness of the entire display device. The direct type backlight module provided by an embodiment of the present invention comprises: a back board, a plurality of point light sources distributed in array and located on the back board, and a diffusion plate located over the plurality of point light sources; wherein a plurality of ring shaped inverted prism structures distributed in array are arranged between the diffusion plate and the plurality of point light sources; each ring shaped inverted prism structure is opposite to one of the plurality of point light sources; a line connecting a center point of each ring shaped inverted prism structure and a point light source opposite to the ring shaped inverted prism structure is perpendicular to a plane, in which the plurality of point light sources are located.

18 Claims, 5 Drawing Sheets

(52) U.S. Cl.
CPC ...... *G02B 6/0016* (2013.01); *G02F 1/133611* (2013.01); *G02F 2001/133607* (2013.01)

(58) Field of Classification Search
CPC .. G02B 5/0231; G02B 5/0215; G02B 6/0016; G02B 6/0025; G02B 6/003; G02B 6/0076; G02B 6/0011; G02B 6/0013; G02B 6/0015; G02B 6/0018; G02B 6/002; G02B 6/0073; G02B 6/0075; G02B 2003/0093; G02B 5/1876
USPC .......... 349/61, 62, 64; 362/97.1, 97.2, 97, 3; 385/33–36
See application file for complete search history.

(56) References Cited

U.S. PATENT DOCUMENTS

| | | | | |
|---|---|---|---|---|
| 8,109,644 | B2* | 2/2012 | Bierhuizen | G02B 6/0018 362/249.02 |
| 8,403,512 | B2* | 3/2013 | Tsukahara | G02F 1/133603 257/98 |
| 2010/0079702 | A1* | 4/2010 | Ito | G02B 6/0013 349/64 |
| 2011/0025947 | A1* | 2/2011 | Thompson | G02B 6/0028 349/62 |
| 2014/0133180 | A1* | 5/2014 | Sakai | G02B 6/0016 362/612 |

* cited by examiner

-- Prior Art --

-- Prior Art --

DIRECT TYPE BACKLIGHT MODULE AND DISPLAY DEVICE

RELATED APPLICATIONS

The present application claims the benefit of Chinese Patent Application No. 201520145672.1, filed Mar. 13, 2015, the entire disclosure of which is incorporated herein by reference.

FIELD OF THE INVENTION

The present invention relates to the technical field of display, in particular to a direct type backlight module and a display device.

BACKGROUND OF THE INVENTION

Liquid crystal display device is a passive light emitting device, which does not emit light by itself, and requires a backlight module to provide light for the liquid crystal panel, so as to display images. Since the backlight module used in a liquid crystal panel has thin, light and power saving characteristics, it is employed in the display devices widely.

Currently, the backlight techniques used in liquid crystal display device mainly comprise: Cold Cathode Fluorescent Lamp (CCFL) and Light Emitting Diodes (LED).

Since the LED backlight module has advantages such as high brightness, high color purity, long life, good reliability, without mercury pollution, etc., the proportion of the LED backlight module is gradually increased in backlight modules.

LED backlight modules can be classified as direct type and side type based on the optical structure. The side type backlight module arranges the light source on a side of the panel; while the direct type backlight module arranges the light source below the panel. As shown in FIG. 1 and FIG. 2, FIG. 1 shows a structural schematic diagram of a direct type backlight source in the prior art; FIG. 2 shows an arrangement of LED lamps in the direct type backlight source in the prior art. The direct type backlight module mainly comprises: a back board 01, a circuit board 02 located in the back board 01, LED lamps 03 distributed with intervals, a reflective sheet 04, a diffusion plate 05, an optical membrane 06, a side reflective sheet 07 and a prism sheet 08, etc.

The light emitted from an LED lamp can be regarded as a point light source; since the light emitted from an LED lamp has a certain light emitting angle, the light intensity of the backlight module may be relatively high in a certain direction, while be relatively low in an other certain direction.

In the prior art, to obtain a homogeneous illumination, the number of the LED lamps or the light mixing distance (which is generally indicated by the distance H from the top of the bottom reflective sheet 04 to the bottom of the diffusion plate 05 in FIG. 1) of the backlight module should be increased, this results in the increase of the cost or the thickness of the backlight module. Moreover, for a certain number of the LED lamps in the backlight system, if the thickness of the backlight module is reduced, the incident light on the display panel may be inhomogeneous, such that obvious spots can be observed on the display device.

SUMMARY OF THE INVENTION

The embodiments of the present invention provide a direct type backlight module and a display device to reduce the light mixing distance on the premise of obtaining a homogeneous illumination, thereby reducing the thickness of the direct type backlight module and the thickness of the entire display device.

An embodiment of the present invention provides a direct type backlight module, wherein the direct type backlight module comprises: a back board, a plurality of point light sources distributed in array and located on the back board, and a diffusion plate located over the plurality of point light sources; wherein a plurality of ring shaped inverted prism structures distributed in array are arranged between the diffusion plate and the plurality of point light sources; each ring shaped inverted prism structure is opposite to one of the plurality of point light sources; a line connecting a center point of each ring shaped inverted prism structure and a point light source opposite to the ring shaped inverted prism structure is perpendicular to a plane, in which the plurality of point light sources are located.

In the direct type backlight module provided by the embodiment of the present invention, a plurality of ring shaped inverted prism structures distributed in array are arranged between the diffusion plate and the plurality of point light sources, therefore the light emitting angle of the point light sources can be expanded, ensuring a homogeneous illumination, reducing the light mixing distance, thereby reducing the thickness of the direct type backlight module and the thickness of the entire display device.

Preferably, the plurality of ring shaped inverted prism structures distributed in array are arranged on a surface of the diffusion plate facing the plurality of point light sources.

Preferably, the plurality of ring shaped inverted prism structures distributed in array are arranged on a light guide medium; the light guide medium is located between the diffusion plate and the plurality of point light sources, and a surface of the light guide medium on which the plurality of ring shaped inverted prism structures distributed in array are arranged faces the plurality of point light sources.

Preferably, the light guide medium is located between crossing points of light emitted from adjacent point light sources and the diffusion plate.

Preferably, the direct type backlight module comprises multiple layers of the light guide medium, and a surface of each layer of the light guide medium on which the plurality of ring shaped inverted prism structures distributed in array are arranged faces the plurality of point light sources.

Preferably, the light guide medium is an optically denser medium, and an optically thinner medium is filled between two adjacent light guide media.

Preferably, angles between three surfaces of each prism on a ring shaped inverted prism structure are arranged such that light emitted from a point light source enters the prism at a light input surface of the prism.

Preferably, the point light sources are LED lamps.

An embodiment of the present invention also provides a display device, wherein the display device comprises a display screen and a direct type backlight module provided by the embodiment of the present invention.

DETAILED DESCRIPTION OF THE INVENTION

The embodiments of the present invention provide a direct type backlight module and a display device to reduce the light mixing distance on the premise of obtaining a homogeneous illumination, thereby reducing the thickness of the direct type backlight module and the thickness of the entire display device.

An embodiment of the present invention provides a direct type backlight module, wherein the direct type backlight module comprises: a back board, a plurality of point light sources distributed in array and located on the back board, and a diffusion plate located over the plurality of point light sources; wherein a plurality of ring shaped inverted prism structures distributed in array are arranged between the diffusion plate and the plurality of point light sources; each ring shaped inverted prism structure is opposite to one of the plurality of point light sources; a line connecting a center point of each ring shaped inverted prism structure and a point light source opposite to the ring shaped inverted prism structure is perpendicular to a plane, in which the plurality of point light sources are located.

In the direct type backlight module provided by the embodiment of the present invention, a plurality of ring shaped inverted prism structures distributed in array are arranged between the diffusion plate and the plurality of point light sources, therefore the light emitting angle of the point light sources can be expanded, ensuring a homogeneous illumination, reducing the light mixing distance, thereby reducing the thickness of the direct type backlight module and the thickness of the entire display device.

In the embodiments of the present invention, the point light sources are illustrated with LED lamps for example; certainly, the point light sources can also be lamps of other types, which are not limited to LED.

Figure 1:
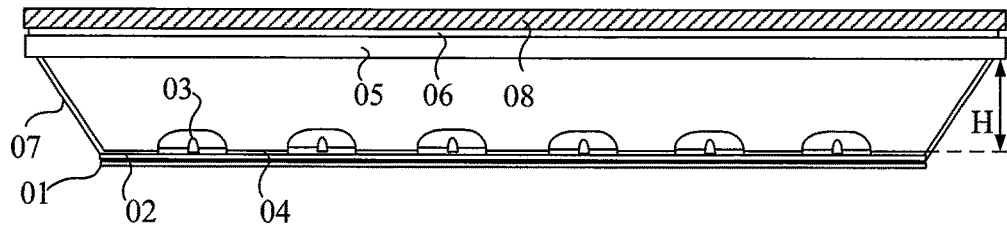
FIG. 1 is a structural schematic diagram of a direct type backlight module in the prior art.
Figure 2:
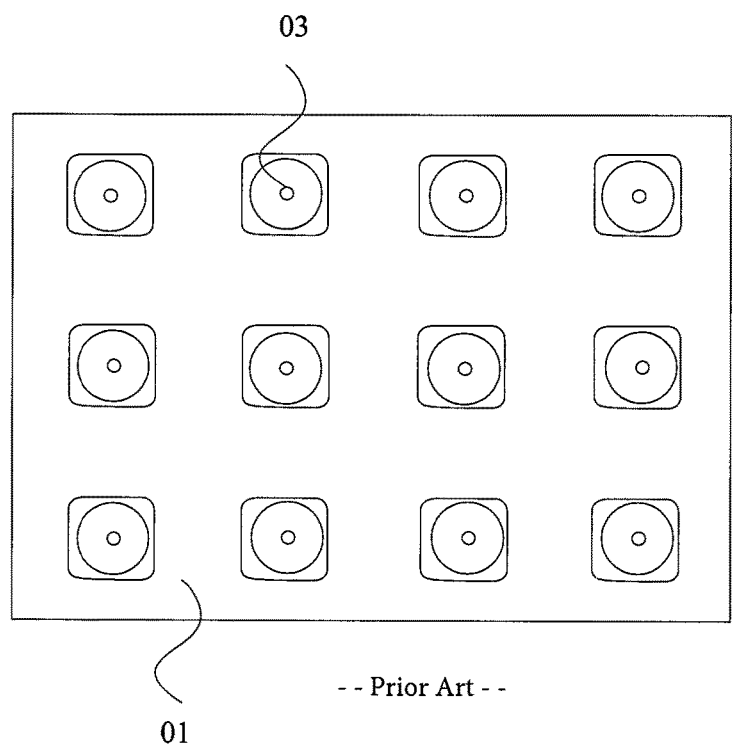
FIG. 2 is an arrangement of LED lamps in the direct type backlight module in the prior art.
Figure 3:
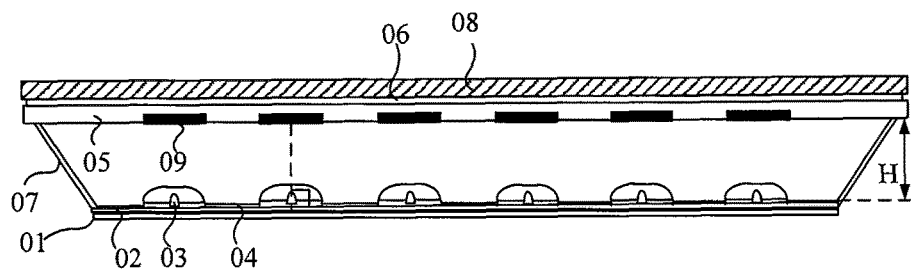
FIG. 3 is a structural schematic diagram of a direct type backlight module provided by an embodiment of the present invention.
Figure 4:
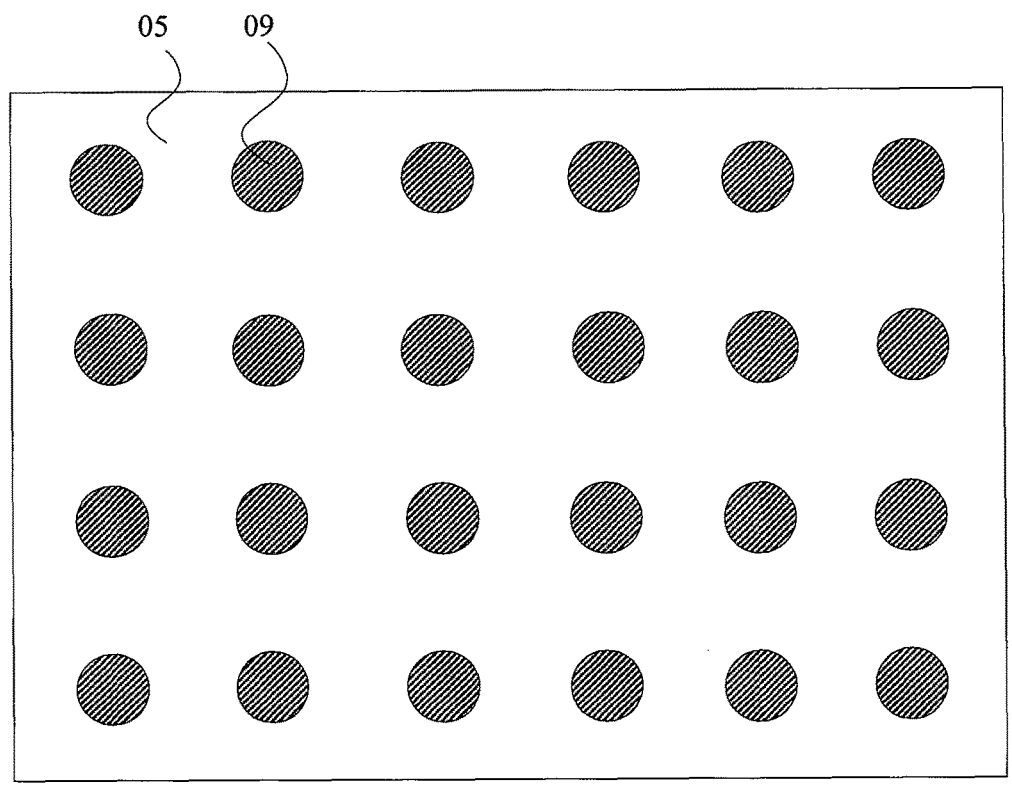
FIG. 4 is a schematic diagram provided by an embodiment of the present invention, in which a surface of a diffusion plate is provided with a plurality of ring shaped inverted prism structures distributed in array.
Figure 5:
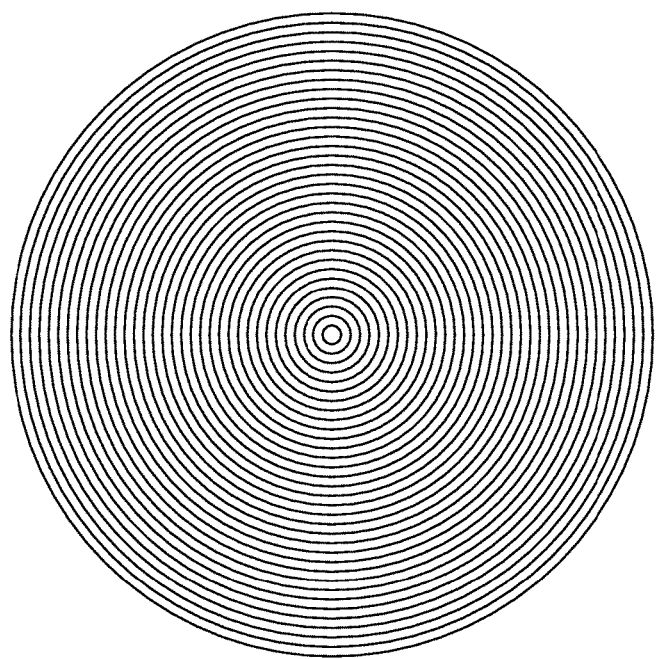
FIG. 5 is a schematic diagram of a ring shaped inverted prism structure provided by an embodiment of the present invention.

In an implementation, as shown in FIG. 3, a plurality of ring shaped inverted prism structures 09 distributed in array are arranged on a surface of the diffusion plate 05 facing the LED lamps 03; each ring shaped inverted prism structure 09 is opposite to one LED lamp. FIG. 5 is a front view of each ring shaped inverted prism structure 09; the size of the ring shaped inverted prism structure 09 can be determined according to practical requirements, for example according to the intensity of the light spots.

Figure 6:
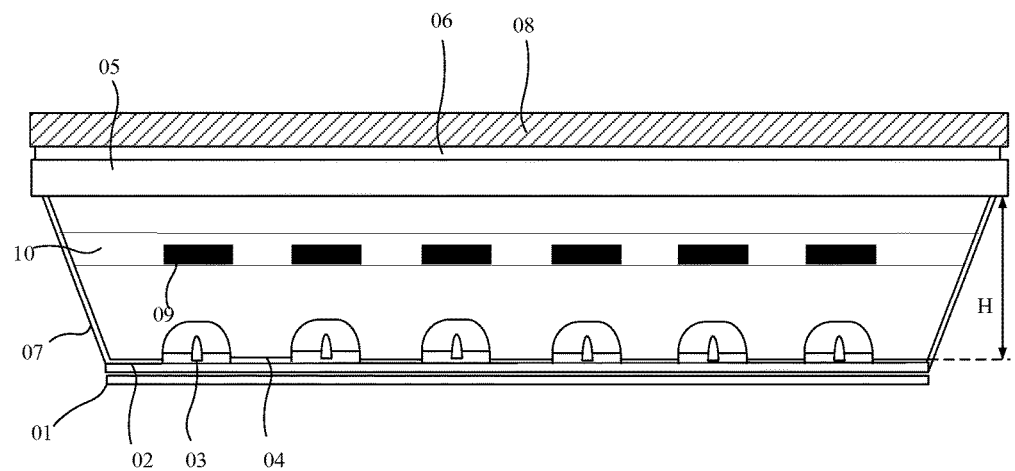
FIG. 6 is a structural schematic diagram of a second kind of direct type backlight module provided by an embodiment of the present invention.

In a second implementation, as shown in FIG. 6, the plurality of ring shaped inverted prism structures distributed in array are arranged on a light guide medium 10; the light guide medium 10 is located between the diffusion plate 05 and the LED lamps 03, and a surface of the light guide medium 10 on which the plurality of ring shaped inverted prism structures 09 distributed in array are arranged faces the LED lamps 03.

Figure 7:
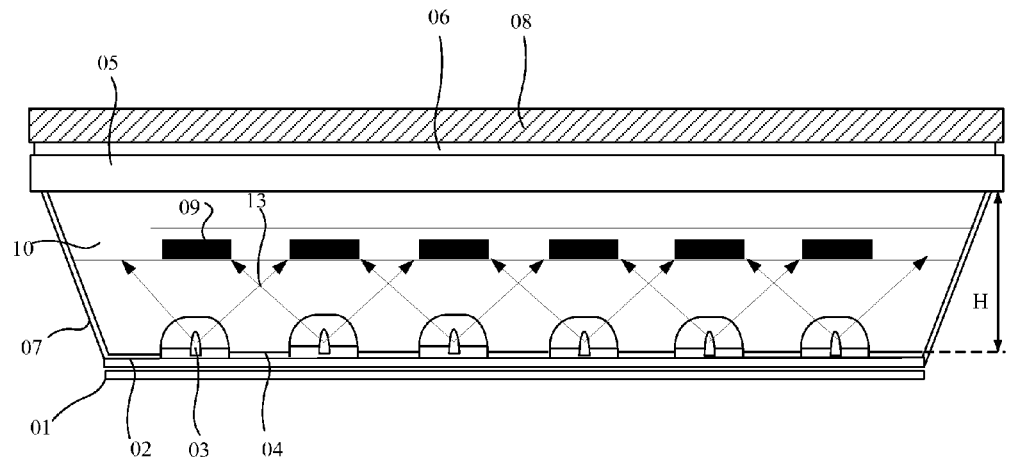
FIG. 7 is a schematic diagram of the second kind of direct type backlight module provided by an embodiment of the present invention, in which the location of a light guide medium provided with a plurality of ring shaped inverted prism structures distributed in array is indicated.

Preferably, as shown in FIG. 7, the light guide medium 10 is located between crossing points of light emitted from adjacent LED lamps 03 and the diffusion plate 05. According to the location of the crossing points of light emitted from adjacent LED lamps 03, the location of the light guide medium 10 should be higher than the crossing points 13; if the location of the light guide medium 10 is lower than the crossing points 13, a negative effect will be achieved. The particular placing height should be various based on a difference such as the arrangement location of the LED lamps.

Figure 8:
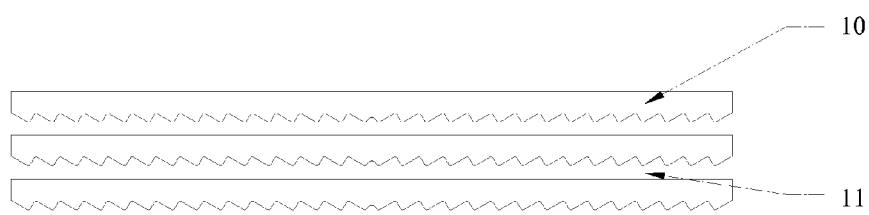
FIG. 8 is a schematic diagram of a third kind of direct type backlight module provided by an embodiment of the present invention, in which a multilayer structure of light guide media provided with a plurality of ring shaped inverted prism structures distributed in array is indicated.

In a third implementation, as shown in FIG. 8, multiple layers of the light guide medium can be arranged between the diffusion plate 05 and the LED lamps 03, and a surface of each layer of the light guide medium 10 on which the plurality of ring shaped inverted prism structures 09 distributed in array are arranged faces the LED lamps. Air 11 can be filled between the adjacent light guide media 10. The sawtooth of the light guide medium 10 shown in FIG. 8 is the cross-section view of the ring shaped inverted prism structure 09; only three layers of the light guide medium are shown in FIG. 8, the cross-section view of only one ring shaped inverted prism structure 09, the other parts are omitted without being shown.

In this implementation, the interference fringe (a fringe phenomenon caused by optical interference) can be eliminated with the thickness of the air layer 11, thereby mixing light sufficiently, improving the light divergent effect of the inverted prism, so as to achieve the effect of reducing the thickness of the product.

Figure 9:
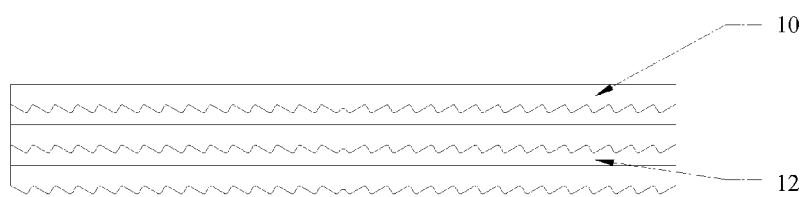
FIG. 9 is a schematic diagram of a fourth kind of direct type backlight module provided by an embodiment of the present invention, in which a multilayer structure of light guide media provided with a plurality of ring shaped inverted prism structures distributed in array is indicated.

In a fourth implementation, as shown in FIG. 9, the light guide medium 10 is an optically denser medium, and an optically thinner medium 12 is filled between two adjacent light guide media 10, such that the multiple layers of the light guide medium 10 can be combined through the optically thinner medium 12, forming a composite structure layer.

In this implementation, the light guide medium 10 is an optically denser medium; the difference between an optically thinner medium and an optically denser medium is the difference between the densities of the light guide media. Compared with the third implementation, this implementation can improve the practicability; moreover, designs such as a "multi-layer membrane" can be achieved based on demands, reducing the light mixing distance of LED greatly, realizing an ultra-thin product.

Preferably, angles between three surfaces of each prism on a ring shaped inverted prism structure are arranged such that light emitted from an LED lamp enters the prism at a light input surface of the prism, avoiding entrance of light at the slope of the shaded side, so as to eliminate the light disturbance. The particular angle can be determined based on practical requirements.

Figure 10:
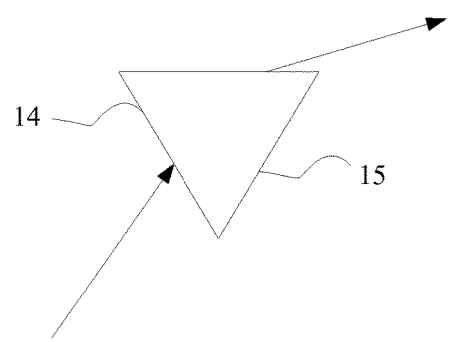
FIG. 10 is a schematic diagram of light path in a single prism of a ring shaped inverted prism structure provided by an embodiment of the present invention.
Figure 11:
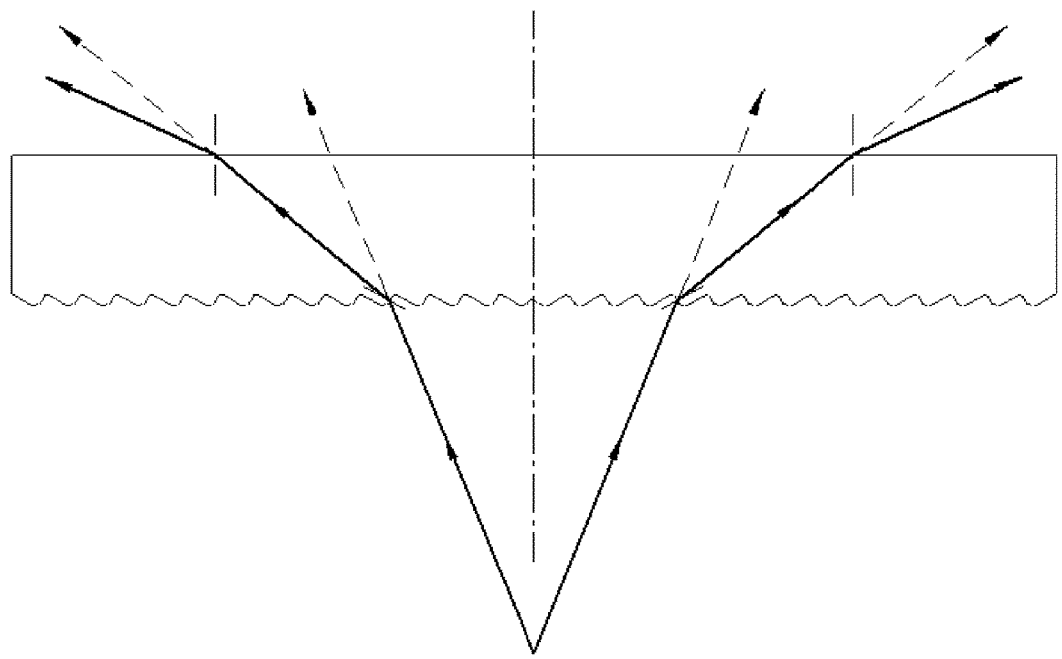
FIG. 11 is a schematic diagram of integral light path in a ring shaped inverted prism structure provided by an embodiment of the present invention.

The direct type backlight module according to the embodiments of the present invention uses the inverted prism structure to further expand the light emitting angle of the LED. The optical effect of the example can be adjusted to the best by adjusting the angle and distance of the prism; when multiple layers of the light guide medium arranged with a plurality of ring shaped inverted prism structures distributed in array are employed, the distances between the light guide media are generally unequal with each other, coping with a precise optical control; likewise, equal distances can also be employed to cope with the general design of cost. It should be considered on the angle design of the prism in the ring shaped inverted prism structure, ensuring light entering the prism at a light input surface of the prism, avoiding entrance of light at the slope of the shaded side, so as to eliminate the light disturbance. As shown in FIG. 10, light from a light source LED lamp below impinges the inverted prism, entering the prism at the light input surface 14, rather than entering the prism at the slope of the shaded side 15; due to the effect of the inverted prism on the light path, the light can be further diffused. The diffused distribution of light path is shown in FIG. 11; the solid lines in FIG. 11 are light paths of the ring shaped inverted prism structure provided by the embodiments of the present invention; the dash lines are light paths of the diffusion plate in the prior art. Therefore, compared with the prior art, by employing the ring shaped inverted prism structure provided by the embodiments of the present invention, the diffusion effect of light is better, thereby reducing the light mixing distance, reducing the number of the LED lamps, and thinning the thickness of the product.

An embodiment of the present invention also provides a display device, wherein the display device comprises a display screen and a direct type backlight module provided by the embodiment of the present invention.

To sum up, in the embodiments of the present invention, due to the light diffusion effect of the inverted prism structures, the light emitting angle of the point light source can be further expanded, reducing the thickness of the product, further improving the ultra-thin design of the direct type backlight module; as can be seen from the simulated light schematic diagram (FIG. 11), the light diffusion effect of the structures provided by the embodiments of the present invention is obviously better than the light mixing effect of the air layer in the existing structure, therefore a manner of multilayer stack (i.e., the third implementation and the fourth implementation mentioned above) can effectively reduce the light mixing height. Since employing the embodiments of the present invention can further realize the thinning design of the direct type backlight module, and can be compatible and combined with the current technology such as LENS, etc., the industrialization process of the direct type backlight module will be greatly promoted; the embodiments of the present invention can further reduce the number of the point light sources, therefore, there is a significant contribution in green production, energy saving and emission reduction.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. A direct type backlight module comprising a back board, a plurality of point light sources distributed in array and located on the back board, and a diffusion plate located over the plurality of point light sources; wherein a plurality of ring shaped inverted prism structures distributed in array are arranged between the diffusion plate and the plurality of point light sources; each ring shaped inverted prism structure is opposite to one of the plurality of point light sources; an apex angle of a prism in the ring shaped inverted prism structures faces the back board; a line connecting a center point of each ring shaped inverted prism structure and a point light source opposite to the ring shaped inverted prism structure is perpendicular to a plane in which the plurality of point light sources are located;

and wherein angles between three surfaces of each prism on a ring shaped inverted prism structure are arranged so that light emitted from a point light source directly enters the prism at a surface of the prism facing the point light source at a first angle with respect to a vertical axis and exits the ring shaped inverted prism structure at a second angle with respect to the vertical axis, where the second angle is greater than the first angle.

2. The direct type backlight module according to claim 1, wherein the plurality of ring shaped inverted prism structures distributed in array are arranged on a surface of the diffusion plate facing the plurality of point light sources.

3. The direct type backlight module according to claim 1, wherein the plurality of ring shaped inverted prism structures distributed in array are arranged on a light guide medium; the light guide medium is located between the diffusion plate and the plurality of point light sources, and a surface of the light guide medium on which the plurality of ring shaped inverted prism structures distributed in array are arranged faces the plurality of point light sources.

4. The direct type backlight module according to claim 3, wherein the light guide medium is located between crossing points of light emitted from adjacent point light sources and the diffusion plate.

5. The direct type backlight module according to claim 4, wherein the direct type backlight module comprises multiple layers of the light guide medium, and a surface of each layer of the light guide medium on which the plurality of ring shaped inverted prism structures distributed in array are arranged faces the plurality of point light sources.

6. The direct type backlight module according to claim 5, wherein the light guide medium is an optically denser medium, and an optically thinner medium is filled between two adjacent light guide media.

7. The direct type backlight module according to claim 3, wherein the direct type backlight module comprises multiple layers of the light guide medium, and a surface of each layer of the light guide medium on which the plurality of ring shaped inverted prism structures distributed in array are arranged faces the plurality of point light sources.

8. The direct type backlight module according to claim 7, wherein the light guide medium is an optically denser medium, and an optically thinner medium is filled between two adjacent light guide media.

9. The direct type backlight module according to claim 1, wherein the point light sources are LED lamps.

10. A display device comprising a display screen and a direct type backlight module; wherein the direct type backlight module comprises: a back board, a plurality of point light sources distributed in array and located on the back board, and a diffusion plate located over the plurality of point light sources; wherein a plurality of ring shaped inverted prism structures distributed in array are arranged between the diffusion plate and the plurality of point light sources; each ring shaped inverted prism structure is opposite to one of the plurality of point light sources; an apex angle of a prism in the ring shaped inverted prism structures faces the back board; a line connecting a center point of each ring shaped inverted prism structure and a point light source opposite to the ring shaped inverted prism structure is perpendicular to a plane in which the plurality of point light sources are located;

and wherein angles between three surfaces of each prism on a ring shaped inverted prism structure are arranged so that light emitted from a point light source directly enters the prism at a surface of the prism facing the point light source at a first angle with respect to a vertical axis and exits the ring shaped inverted prism structure at a second angle with respect to the vertical axis, where the second angle is greater than the first angle.

11. The display device according to claim 10, wherein the plurality of ring shaped inverted prism structures distributed in array are arranged on a surface of the diffusion plate facing the plurality of point light sources.

12. The display device according to claim 10, wherein the plurality of ring shaped inverted prism structures distributed in array are arranged on a light guide medium; the light guide medium is located between the diffusion plate and the plurality of point light sources, and a surface of the light guide medium on which the plurality of ring shaped inverted prism structures distributed in array are arranged faces the plurality of point light sources.

13. The display device according to claim 12, wherein the light guide medium is located between crossing points of light emitted from adjacent point light sources and the diffusion plate.

14. The display device according to claim 13, wherein the direct type backlight module comprises multiple layers of the light guide medium, and a surface of each layer of the light guide medium on which the plurality of ring shaped inverted prism structures distributed in array are arranged faces the plurality of point light sources.

15. The display device according to claim 14, wherein the light guide medium is an optically denser medium, and an optically thinner medium is filled between two adjacent light guide media.

16. The display device according to claim 12, wherein the direct type backlight module comprises multiple layers of the light guide medium, and a surface of each layer of the light guide medium on which the plurality of ring shaped inverted prism structures distributed in array are arranged faces the plurality of point light sources.

17. The display device according to claim 16, wherein the light guide medium is an optically denser medium, and an optically thinner medium is filled between two adjacent light guide media.

18. The display device according to claim 10, wherein the point light sources are LED lamps.

* * * * *